United States Patent [19]

Suzuki et al.

[11] Patent Number: 4,803,653
[45] Date of Patent: Feb. 7, 1988

[54] MEMORY CONTROL SYSTEM

[75] Inventors: Kenji Suzuki; Toshiyuki Takagi; Tomoya Nishi, all of Hadano, Japan

[73] Assignee: Hitachi, Ltd., Tokyo, Japan

[21] Appl. No.: 893,817

[22] Filed: Aug. 6, 1986

[51] Int. Cl.⁴ .............................................. G06F 9/00
[52] U.S. Cl. ................................................... 364/900
[58] Field of Search ... 364/200 MS File, 900 MS File

[56] References Cited

U.S. PATENT DOCUMENTS

| | | | |
|---|---|---|---|
| 4,428,063 | 1/1984 | Fourcade | 364/900 |
| 4,428,064 | 1/1984 | Hempy et al. | 364/900 |
| 4,494,215 | 1/1985 | Koike et al. | 364/900 |
| 4,513,392 | 4/1985 | Shenk | 364/900 |
| 4,535,330 | 8/1985 | Carey et al. | 364/900 |
| 4,558,429 | 12/1985 | Barlow et al. | 364/900 |

Primary Examiner—Thomas M. Heckler
Assistant Examiner—Joseph T. Fitzgerald
Attorney, Agent, or Firm—Antonelli, Terry & Wands

[57] ABSTRACT

A memory control system connects, by a single memory bus, plural memories that are individually operable and plural memory access source units so as to effectively use the single memory bus. The memory control system includes a memory request acceptance unit that permits each memory access source unit access to the memories on the basis of the type of access request from each memory access source unit and the type of access request in the memory that is in operation.

10 Claims, 7 Drawing Sheets

| REQUEST TYPE IN OPERATION IN MEMORY B | OUTPUT FROM BUS BUSY CREATION UNIT | | | | | | REQUEST TYPE ACCEPTABLE FOR ACCESS TO MEMORY A | | | |
|---|---|---|---|---|---|---|---|---|---|---|
| | 1 | 2 | 3 | 4 | 5 | 6 | nW | nR | 2nW | 2nR |
| nW | 1 | 1 | | | | | × | × | × | × |
| | 1 | | | | | | × | | × | × |
| nR | 1 | | | | | 1 | × | × | × | × |
| | | | | 1 | | | ○ | ○ | ○ | ○ |
| | | | 1 | | | | ○ | ○ | × | ○ |
| | | 1 | | | | | × | ○ | × | ○ |
| | 1 | | | | | | × | × | × | × |
| 2nW | 1 | 1 | 1 | | | | × | × | × | × |
| | 1 | 1 | | | | | × | × | × | × |
| | 1 | | | | | | × | × | × | × |
| 2nR | 1 | | | | 1 | 1 | × | × | × | × |
| | | | | 1 | 1 | | ○ | × | ○ | × |
| | | | 1 | 1 | | | ○ | ○ | × | ○ |
| | | 1 | 1 | | | | × | ○ | × | ○ |
| | 1 | 1 | | | | | × | × | × | × |
| | 1 | | | | | | × | × | × | × |

FIG. 8

MEMORY CONTROL SYSTEM

BACKGROUND OF THE INVENTION

This invention relates to a memory control system used in a computer system in which plural memories that are individually operable are connected with the same memory bus.

Figure 7:
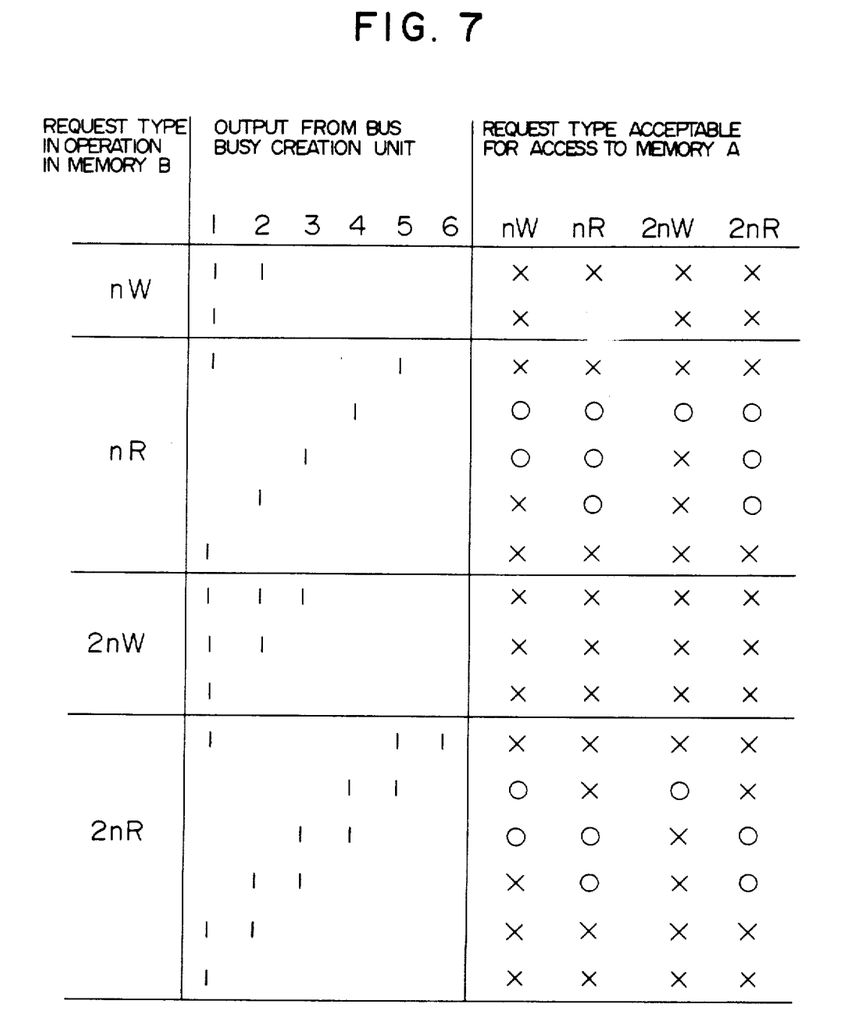
FIG. 7 is a diagram for explaining the operation of a bus busy creation unit and a request type decision unit in this invention.

For shortening memory access time in a computer system provided with plural individually operable memories, it has been proposed to provide as many memory buses as there are the memories. In such case, as the number of memories increases the number of memory buses is also increased, and the number of data lines between the memories and the memory access source units also increases. However, in the case where the control units for the respective memories on the memory access source units are formed in a large scale integrated circuit, the number of the I/O lines for each unit is limited so that it is preferable to reduce the number of the data lines between the units. To this end, it has been proposed to connect the plural individually operable memories with the memory access source units through the same memory bus.

Where plural memories are connected with the same memory bus, execution of one memory access operation generally occupies the memory bus until this operation is terminated. Therefore, when the transfer of address information and data in a memory read operation is carried out with a pause therebetween using the same memory bus, the use of the memory bus in this memory read operation results in a free time between the termination of the address transfer and the initiation of the read data transfer, as shown in FIG. 7. Although the associated memory is in operation during this free time, some other memories connected with the memory bus can accept memory access. The prior art, for example JP-A-56-96311 does not provide for the memory bus during this free time.

SUMMARY OF THE INVENTION

An object of this invention is to provide a memory control system, in a computer system provided with plural individually operable memories and plural memory access source units, for improving the use rate of a memory bus and thereby shortening the memory access time from each of the memory access source units without increasing the number of memory buses.

To attain this object, in accordance with this invention, plural memories and plural access source units are connected with each other through a single memory bus. A control unit permits, on the basis of the type of an access request from respective access source unit and the type of an access request in the memory now in operation, a memory access request so long as the memory bus is free, thereby enabling the memory bus to be effectively used. In one embodiment of this invention, during read operation for a first memory, a free tim produced during a pause between the termination of address transfer the initiation of the read data transfer is used to permit a write access request for a second memory.

The above and other objects, features, and advantages of this invention will be better understood from the following detailed description taken in conjunction with the accompanying drawings.

DESCRIPTION OF THE PREFERRED EMBODIMENTS

Figure 3:
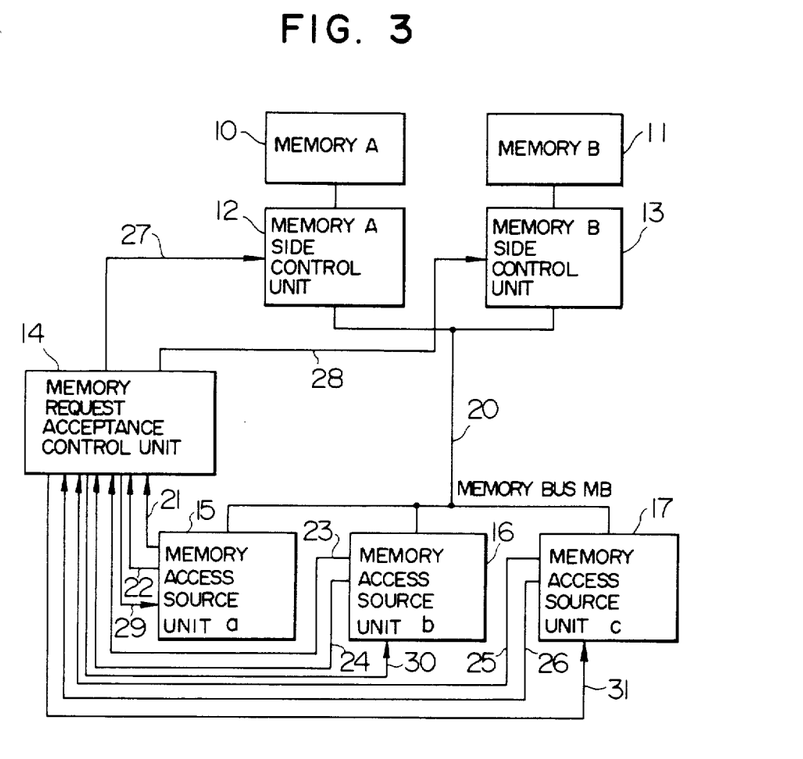
FIG. 3 is a block diagram of one embodiment according to this invention.

FIG. 3 shows a system in block form one embodiment of constructed according to this invention, in which two individually operable memories (A) 10 and (B) 11 and three memory access source units 15, 16 and 17 are connected through the same memory bus 20. Memory access source unit 15 sends a memory access request to a memory request acceptance control unit 14 using a memory request signal line 21 and some supplemental signal line 22 indicative of the type of the memory access request. Memory request acceptance control unit 14 determines whether the requested memory is in operation or not, and whether the using time of memory bus 20 is overlapped or not.

If memory request acceptance control unit 14 determine that the associated memory is not in operation and the using time of memory bus 20 is not overlapped, it sends back an accept signal 29 to memory access source unit 15 and sends a memory activation signal 27 to a memory A side control unit 12, if the associated memory is memory (A) 10, so as to instruct the activation of the memory. When memory access source unit 15 receives accept signal 29, it sends an address to memory bus 20. In the case of a write operation, memory access source unit 15 sends write data during the subsequent cycle in succession to the address, thus terminating the interface with the memory. In the case of a read operation, memory access source unit 15 waits to read data after the address transfer.

Memory A side control unit 12 operates in accordance with the activation instruction from memory request acceptance control unit 14. In the case of the write operation, it successively takes in the address and write data from memory bus 20 and writes the data in memory (A) 10 at the associated address thereof. In the case of the read operation, memory A side control unit 12 takes in the address from memory bus 20 and sends it to memory (A) 10. Memory A side control unit 12 sends out the read data to memory bus 20 after a predetermined time.

The relative operation between memory access source units 16, 17 and memory request acceptance control unit 14 and between memory request acceptance control unit 14 and memory B side control unit 13 are also carried out in the same manner as mentioned above.

Figure 1:
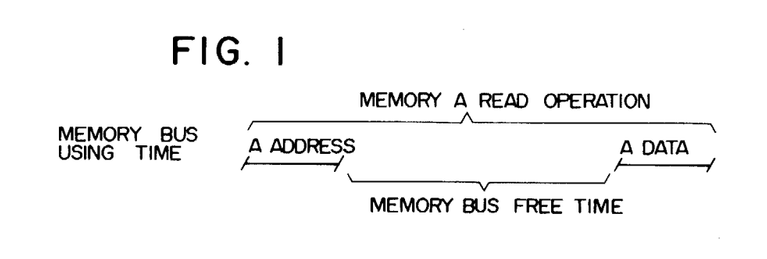
FIG. 1 is a timing chart for explaining the prior art.
Figure 2A:
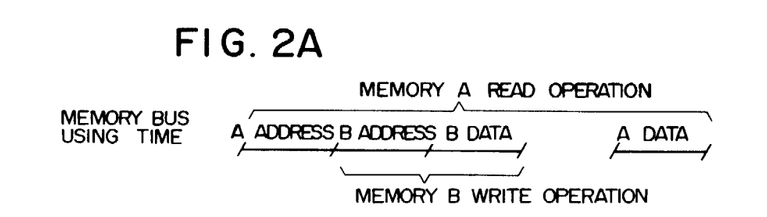
FIGS. 2A and 2B are timing charts for the basic idea of this invention.
Figure 2B:
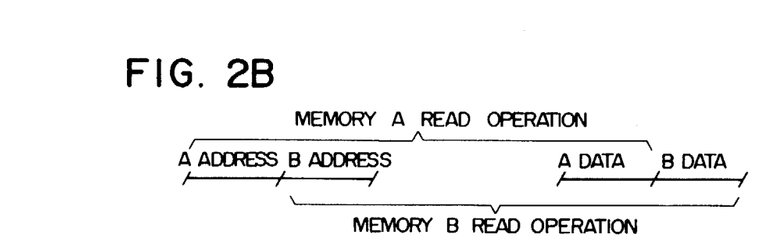

FIGS. 2A and 2B are timing charts for explaining the basic idea of this invention. In FIG. 2A, the write operation of memory (B) 11 is performed in memory bus free time during the read operation of memory (A) 10. In FIG. 2B, the read operations of both memory (A) 10 and memory (B) 11 overlap each other so that the memory bus is effectively used.

Figure 4:
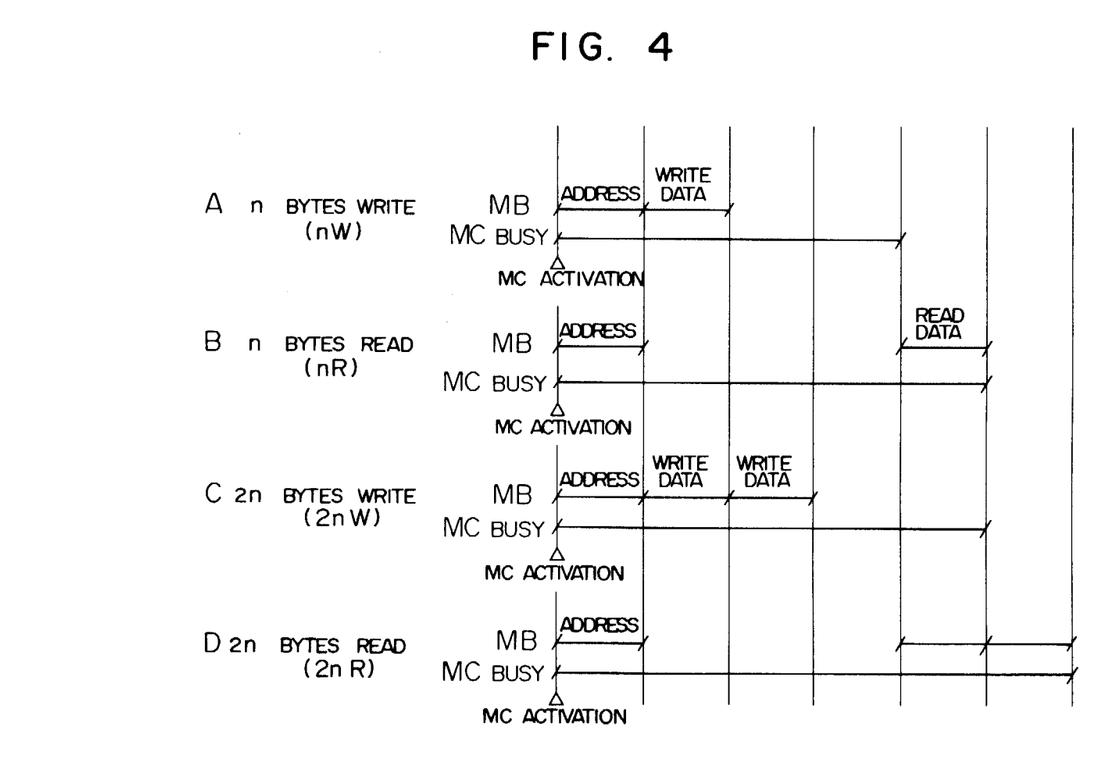
FIG. 4 is a timing chart of relations between request types and a memory bus, using times and between the request types and "busy" of a memory side control unit.

The operation of memory request acceptance control unit 14 will be explained below. The relations between the operation time of memory side control units (MC) 12, 13 and the use time of memory bus (MB) 20 are uniquely decided in accordance with the types of memory access operations. FIG. 4 shows the relations corresponding to four types of memory access operations assuming that the memory bus width is n byte(s). FIG. 4 (A) illustrates the operation of n bytes write (nW). The address and write data are transferred to the memory bus at a first stage and at a second stage, respectively. The write operation requires three stages after the write data is given to the memory so that the memory control unit MC is busy over four stages from the first stage. FIG. 4 (B) illustrates the operation of n bytes read (nR), FIG. 4 (C) illustrates the operation of 2n bytes write (2nW) and FIG. 4 (D) illustrates the operation of 2n bytes read (2nR).

As seen from FIG. 4, memory request acceptance control unit 14 can determine the use time of memory bus 20 and the operation time of memory side control units 12, 13 by providing flags activated in association with the memories to indicate access operations and a counter for indicating which stage the associated access operation is executing. Thus, memory acceptance control unit 14 can make a judgement on whether memory access requests from memory access source units 15, 16 and 17 should be accepted or not.

Figure 5:
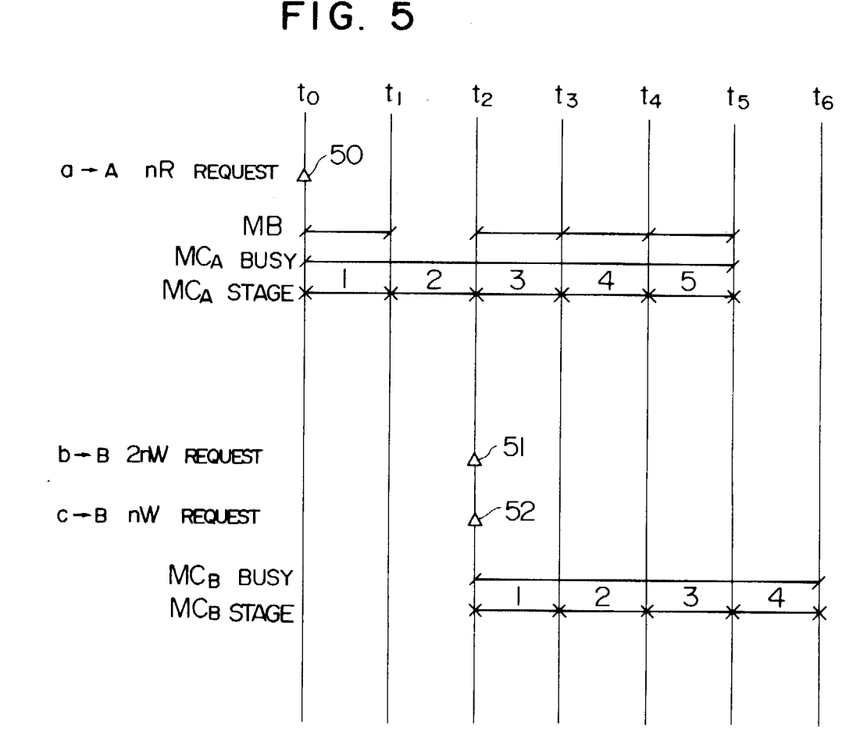
FIG. 5 is a timing chart showing one example of the operation of the memory control system.

In the case where the relation between the use time of memory bus (MB) 20 and the operation time of memory side control units (MC) 12, 13 in FIG. 3 is as shown in FIG. 4, it is assumed that memory access requests as shown in FIG. 5 have been issued, and it is also assumed that the acceptance priority among memory access source units 15, 16 and 17 is in the order of a >b >c.

At the time $t_0$, memory request acceptance control unit 14 accepts an n bytes read request (nR request) 50 from memory access source unit (a) 15 to memory (A) 10, thereby activating memory A side control unit 12. Thus, memory A control unit 12 becomes busy (MCA busy). During the period $t_0-t_1$, the address from memory access source unit (a) 15 to memory (A) 10 (aA address) is sent out to memory bus (MB) 20. Also during the period of $t_4-t_5$, the read data from memory (A) 10 to memory access source unit (a) 15 (aA read data) is sent out to memory bus 20.

At the time $t_2$, there are issued the 2n bytes write request (2nW request) 51 from memory access source unit (b) 16 to memory (B) 11 and the n bytes write request (nW request) 52 from memory access source unit (C) 17 to memory (B) 11. In this case, the 2nW request 51 from memory access source unit (b) 16 is not accepted by memory request acceptance control unit 14 since the 2n bytes write operation overlaps the n bytes read operation of memory access source unit (a) 15 during the period of $t_4-t_5$ in their time of use of memory bus 20, as seen from FIG. 4. On the other hand, the n W request 52 from memory access source unit (b) 17 is accepted by memory request acceptance control unit 14 since the n bytes write operation does not overlap the n bytes read operation of memory access source unit (a) 15 although memory access source unit (C) 17 is lower in priority than memory access source unit (b) 17. The acceptance of the nW request 52 activates memory B side control unit 13. Thus, memory B side control unit 13 become busy (MCB busy). The address (CB address) and write data (CB data) from memory access source unit (C) 17 to memory (B) 11 are sent out to memory bus (MB) 20.

Figure 6:
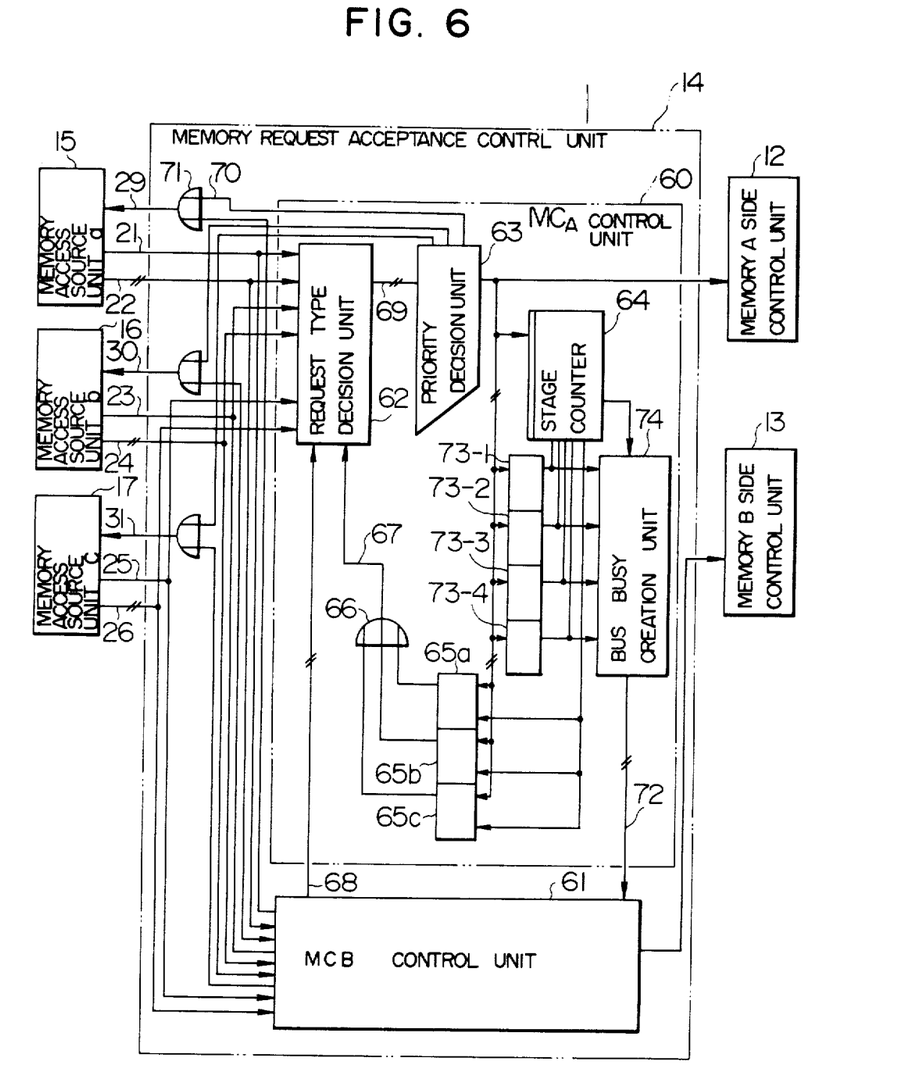
FIG. 6 is a diagram of the details of a memory request acceptance control unit in this invention.

FIG. 6 shows the detail of memory request acceptance control unit 14. Memory request acceptance control unit 14 includes MCA control unit 60 and MCB control unit 61, corresponding with memory side control units 12 and 13, respectively. Although only the detail of MCA control unit 60 is shown, MCB control unit 61 also has the same arrangement.

Memory request acceptance control unit 14 operates as follows. Memory request signal 21 and memory request supplemental signal 22 are applied to a request type decision unit 62 of each of MCA control unit 60 and MCB control unit 61. Memory request supplemental signal 22 indicates the destination and type of the request. If the destination is memory (A) 10, request type decision unit 62 of MCA control unit 60 operates and if the destination is memory (B) 11, that of MCB control unit 61 operates. The following explanation will be given mainly for MCA control 60.

Request type decision unit 62 also receives an output 67 from an OR gate 66 for ORing outputs from MCA busy flags 65a, 65b and 65c, and six outputs 68 from a bus busy creation unit 74 of MCB control unit 61. If the output 67 from OR gate 66 is "1", it indicates that MCA 12 is in operation and busy. More specifically, if the output from MCA busy flag 65a is "1", it indicates that MCA 12 is in operation due to the request from memory access source (a) 15; if the output from MCA busy flag 65b is "1", it indicates that MCA 12 is in operation due to the request from memory access source unit (b) 16; and if the output from MCA busy flag 65c is "1", it indicates that MCA 12 is in operation due to the request from memory access source unit (c) 17. In this embodiment, plural MCA flags are provided correspondingly to the memory access source units, but a single MCA flag may be provided. However, the arrangement, as shown in FIG. 6, indicating the memory access source unit that is operating MCA 12, makes it convenient to report, when an error occurs, the error to that memory access source unit.

Request type decision unit 62 decides all the requests now acceptable on the basis of the requests from three memory access source units 15, 16 and 17, via the output 67 from OR gate 66 and six outputs 68 from the bus busy creation unit of MCB control unit 61, and reports them to a priority decision unit 63 through lines 69.

Priority decision unit 63 selects a single request from the above acceptable requests considering the priority order among them. Priority decision unit 63, when having selected the request from e.g. memory access source unit (a) 15, sends an accept signal 29 to the memory access source unit (a) 15 via a line 70 and an OR gate 71. Priority decision unit 63 also activates MCA 12 by an activation signal and starts the count-up of a stage counter 64. Priority decision unit 63 sets to, by an access source signal, one of MCA busy flags 65a, 65b and 65c corresponding to the memory access source unit that issued the accepted request and thus causes the MCA busy flag to indicate the MCA busy. Priority decision unit 63 also sets "1", by a request type signal, one of four request type indication flags 73-1, 73-2, 73-3 and 73-4, corresponding to the type of the accepted request.

Stage counter 64 is connected with the outputs from request type indication flags 73. When stage counter 64 counts the number of stages corresponding to the type of the accepted request, it produces a signal on a line 75. This signal resets the set MCA flag to cancel the MCA busy. The number of counts in stage counter 64, equal to that of stage the indicated by the MC busy in FIG. 4, is as follows

| Request Type | Number of Counts |
|---|---|
| nW | 4 |
| nR | 5 |
| 2nW | 5 |
| 2nR | 6 |

Bus busy creation part 74, connected with stage counter 64 and request type indication flag 73, indicates, by six outputs 72, stages in which the memory bus will be used in the subsequent six stages, as seen from a column of the outputs of the bus busy creation unit in FIG. 7. Namely, these outputs 1 to 6 indicate the bus busy states ("1" indicates the stage of the bus busy) over 1 to 6 six stages during the operation of each request type. For example, the first line of request type nW indicates the case where the operation of request type nW starts from the next stage, and the memory bus will be used over the next stage (first stage) to the stage after next (second stage). The second line of request type nW indicates the case where the operation of request type nW has advanced by one stage and the memory bus will be used at the next stage. The lines for other request type, nR, 2nW and 2nR also indicate similar matters.

Figure 8:
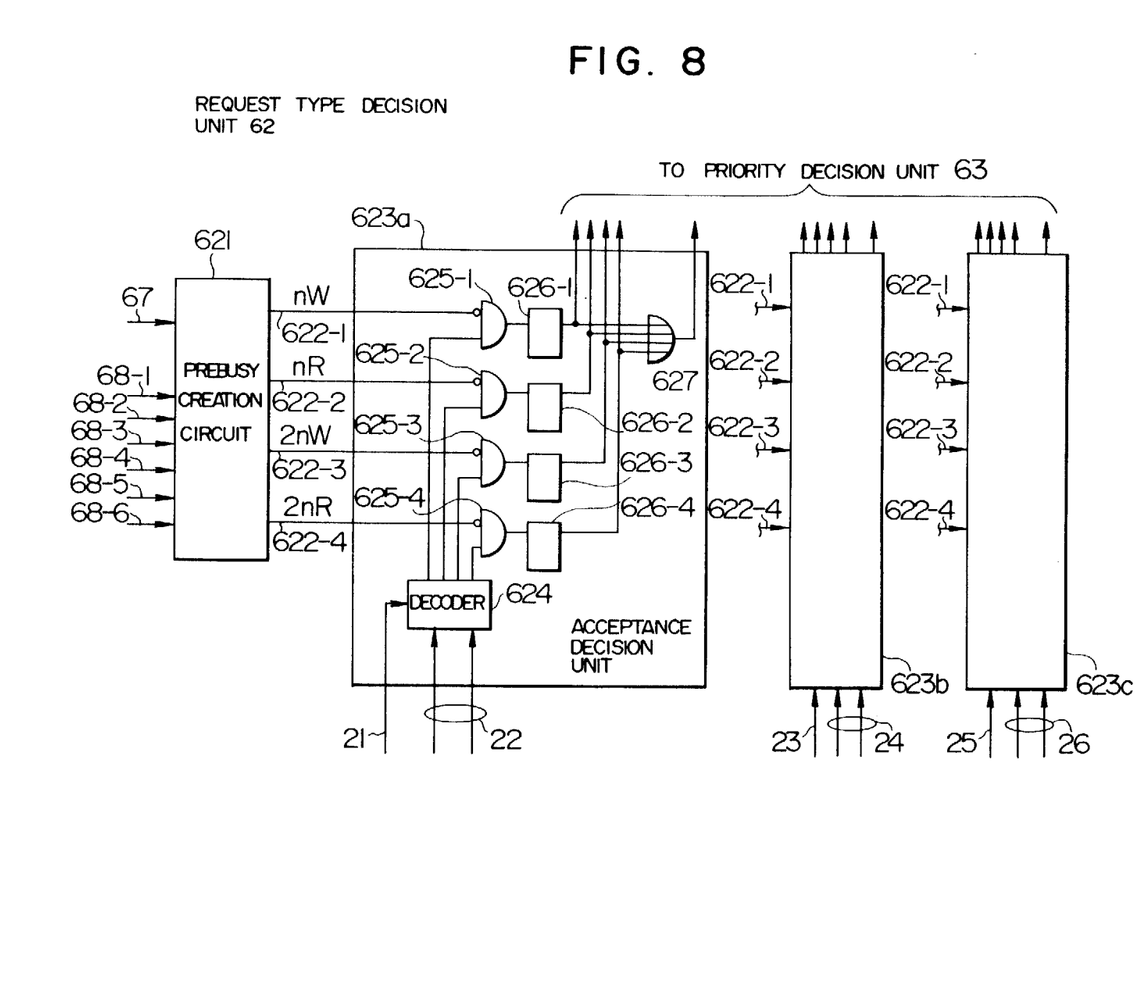
FIG. 8 is a diagram showing the details of the request type decision unit.

FIG. 8 shows the detail of request type decision unit 62 in MCA control unit 60 of FIG. 6. In FIG. 8, a prebusy creation circuit 621 is connected with output 67 from OR gate 66 in MCA control unit 60 and six outputs 68-1 to 68-6 from bus busy creation unit 74 in MCB control unit 61. Prebusy creation circuit 621 indicates by "1" on one or more of its four outputs 622-1 to 622-4 which request type cannot be now accepted. For example, "1" at output 622-1 represents that request type nW is not acceptable while "0" at output 622-1 represents that request type nW is acceptable. To indicate such a fact, output 622-2 is provided for request type nR, output 622-3 is provided for request type 2nR and output 622-4 is provided for request type 2nW.

If output 67 from OR gate 66 is "1" i.e. memory A is in operation, all the outputs 622-1 to 622-4 are "1", which indicates that all the requests are not acceptable. On the other hand, if output 67 from or gate 66 is "0", i.e., memory A is not in operation, some request types are acceptable as the case may be. Such acceptable request types are indicated in the column "request type acceptable for access to memory A" of FIG. 7 by mark O (nonacceptable request types are indicated by mark X). For example, if the request type nW is operating in memory B, any request type is not acceptable since the memory bus is busy. If the request type nR is operating in memory B, in the case of its third line, the request types nW, nR and 2nR for memory A are acceptable but request type 2nW is not acceptable. These facts can be easily understood by investigating the memory access operations of the respective request types as shown in FIG. 4 or the outputs from the bus busy creation unit as shown in FIG. 7.

Outputs 622-1 to 622-4 are sent to acceptance decision part 623a to 623c corresponding to memory access source units 15 to 17 (623a is only shown in FIG. 7 for simplicity of explanation). Acceptance decision unit 623 accepts memory access signal 21 and request type signal 22 from memory access source unit (a) 15. The request type signal represents one of four request types by 2 bits. Decoder 624, when the access request signal 21 is given, decodes the request type signal applied and provides "1" at one of its four outputs corresponding to the request types. And gates 625-1 to 625-4, corresponding to the four request types, provide their output to latches 626-1 to 626-4, respectively. When latch 626-1 is set, it indicates that the request type nW from memory access source unit (a) 15 is acceptable. Other latches 626-2 to 626-4, corresponding to the request types nR, 2nW and 2nR, respectively, also perform the same function as 626-1. Outputs from latches 626-1 to 626-4 are applied to priority decision unit 63 directly and also through an OR gate 627.

Priority decision unit 63 receives like signals from three acceptance decision units 623a to 623c. Priority decision unit 63 selects the output from one of the acceptance decision unit in accordance with the priority order, a >b >c. Then, priority decision unit 63 produces the accept signal, activation signal, access source signal and request type signal.

As understood from the above explanation, in accordance with this invention, in a computer system provided with plural individually operable memories and memory access units, the use rate of a single memory bus can be improved and so the memory access time of each of the memory access source units can be shortened without increasing the number of the memory bus. For example, in the case where in the system of FIG. 3, the same number of read access requests and write access requests are provided for two different memories, all the write access operations are executed while the read access operations are being executed. Therefore, the memory access in the system of FIG. 3 can be executed in the same access time as the case where two memory buses are provided correspondingly to the two memories.

We claim:

1. A memory control system comprising:
a plurality of individually operable memory units;
a plurality of memory access source units for generating an access request and applying the generated access request to one of the plurality of memory units;
a signal memory bus in data communication between the plurality of memory units and the plurality of memory access source units, for selectively transmitting address information and data during one of a plurality of time slots;
means for receiving a present access request from the memory access source units;
first means for detecting a memory conflict between the present access requested and a previous access request received prior to the present access request;
means for predicting which future time slots are to be used for transmitting data and address information, the prediction being based on the type of access request generated, the relationship between the type of access request and the future time slots of the bus being predefined;

second means for detecting a bus conflict between one of the predicted time slots and a previously predicted time slot for the previous access request; and means for rejecting the present access request when a conflict on the bus or in the requested memory unit is detected by the detection means.

2. A memory control system according to claim 1, wherein the first detection means comprises means for generating busy flags, each busy flag being uniquely assigned to one of the memory units, for indicating whether the corresponding memory units are in operation.

3. A memory control system according to claim 1, wherein the prediction means comprises means for storing the relationship between the type of access request and future time slots of the bus, and means for generating busy information which represents whether future time slots of the bus are to be in use.

4. A memory control system according to claim 3, wherein the prediction means further comprises means for counting the number of time slots between a present time slot and said one of the predicted time slots.

5. A memory control system according to claim 4, further comprising means for storing the number of the time slot which is needed for memory unit operation, the stored number being uniquely defined by the received access request, means for comparing the number from the storing means and the number from the counting means, and means resetting the busy flag when coincidence is detected by the comparing means.

6. A memory control system according to claim 1, further comprising means for allowing use of the bus by the memory access source unit generating the present access request when a conflict on the bus and in the memory unit is not detected.

7. A memory control system according to claim 1, further comprising means for selecting one of the received access requests in accordance with a priority order among those memory access source units which generate the received access requests.

8. A memory control method for a system having a plurality of individually operable memory units, a plurality of memory access source units for generating an access request and applying the generated access request to one of the plurality of memory units, and a signal memory bus in data communication between the plurality of memory units and the plurality of memory access source units, said method comprising the steps of:

selectively transmitting address information and data through the signal memory bus during one of a plurality of time slots;

receiving a present access request from the memory access source units;

detecting a memory conflict between the present access request and a previous access request received prior to the present access request;

predicting which future time slots are to be used for transmitting data and address information, the prediction being based on the type of access request generated, the relationship between the type of access request and the future time slots of the bus being predefined;

detecting a bus conflict between one of the predicted time slots and a previously predicted time slot for the previous access request; and rejecting the present access request when a conflict on the bus or in the requested memory is detected.

9. A memory control method according to claim 8, further comprising allowing use of the bus by the memory access source unit generating the present access request when a conflict on the bus or in the memory unit is not detected.

10. A memory control system comprising:
a plurality of individually operable memory units;
a plurality of memory access source units for generating an access request and applying the generated access request to one of the plurality of memory units;
a signal memory bus in data communication between the plurality of memory units and the plurality of memory access source units, for transmitting data during one of a plurality of time slots;
means for receiving a present access request from the memory access source units;
first means for detecting memory conflict between the present access request and a previous access request received prior to the present access request;
means for predicting the time that the use of the bus will occur for transmitting data, the prediction being based on the type of access request generated, the time that the use of the bus will occur being predefined by the type of access request;
second means for detecting whether the use of the bus by the previous access request and the present access request are to occur at the same time; and
means for rejecting the present access request when a conflict on the bus or in the memory is detected by the detection means.

* * * * *

UNITED STATES PATENT AND TRADEMARK OFFICE
CERTIFICATE OF CORRECTION

PATENT NO. : 4,803,653

DATED : February 7, 1989

INVENTOR(S) : SUZUKI, et al

It is certified that error appears in the above-identified patent and that said Letters Patent is hereby corrected as shown below:

On the title page item [45] Date of Patent from

"Feb. 7, 1988" to --Feb. 7, 1989--;

Please insert:

Signed and Sealed this

Second Day of July, 1991

Attest:

HARRY F. MANBECK, JR.

*Attesting Officer*   *Commissioner of Patents and Trademarks*